(12) United States Patent
Hymer (10) Patent No.: US 9,868,523 B2
(45) Date of Patent: Jan. 16, 2018

(54) VERTICAL TAKE-OFF AND LANDING (VTOL) FIXED WING AIRCRAFT

(71) Applicant: Hi-Lite Aircraft, Bannister, MI (US)

(72) Inventor: Jeffrey Hymer, Bannister, MI (US)

(73) Assignee: Hi-Lite Aircraft, Bannister, MI (US)

( * ) Notice: Subject to any disclaimer, the term of this patent is extended or adjusted under 35 U.S.C. 154(b) by 198 days.

(21) Appl. No.: 14/997,955

(22) Filed: Jan. 18, 2016

(65) Prior Publication Data
US 2016/0207624 A1 Jul. 21, 2016

Related U.S. Application Data

(60) Provisional application No. 62/104,902, filed on Jan. 19, 2015.

(51) Int. Cl.
| | |
|---|---|
| *B64C 29/00* | (2006.01) |
| *B64C 15/02* | (2006.01) |
| *B64D 27/18* | (2006.01) |
| *B64D 27/20* | (2006.01) |

(52) U.S. Cl.
CPC ............ *B64C 29/005* (2013.01); *B64C 15/02* (2013.01); *B64C 29/0066* (2013.01); *B64D 27/18* (2013.01); *B64D 27/20* (2013.01)

(58) Field of Classification Search
CPC ............ B64C 29/0008; B64C 29/0016; B64C 29/0025; B64C 29/0041; B64C 29/005; B64C 29/0058; B64C 29/0066; B64C 15/00; B64C 15/02

See application file for complete search history.

(56) References Cited

U.S. PATENT DOCUMENTS

| | | | |
|---|---|---|---|
| 2,462,182 A | 2/1949 | E et al. | |
| 2,838,257 A | 6/1958 | Wibault | |
| 2,930,546 A | 3/1960 | Wibault | |
| 3,103,325 A * | 9/1963 | Leutzinger | ............ B64C 39/001 244/12.1 |
| 3,267,311 A | 8/1966 | C | |
| 3,318,097 A | 5/1967 | Wood et al. | |
| 3,442,469 A * | 5/1969 | Davis | .................... B64C 39/001 244/23 C |
| 3,465,988 A | 9/1969 | Orr | |
| 3,823,897 A * | 7/1974 | Bloomquist | ........ B64C 29/0041 244/12.1 |

(Continued)

*Primary Examiner* — Richard G Davis
(74) *Attorney, Agent, or Firm* — Endurance Law Group PLC (57) ABSTRACT

A fixed wing type Vertical Take-Off and Landing (VTOL) aircraft retains a conventional seating arrangement and utilizes a single point VTOL lift source, in the form of a counter-rotating centrifugal compressor assembly having co-axially aligned upper and lower impellers. Air is fed to the upper impeller through a central intake, and to the lower impeller through either a VTOL mode intake or a flight mode intake. Air is exhausted from the impellers through a plurality of main air outlets. Each main air outlet is fitted with a thrust augmentation duct that can be pivoted downward for VTOL, or rearward for forward flight. A controller alternately closes the flight mode intake when the thrust augmentation ducts are in the downwardly pointing VTOL position, and closes the VTOL mode intakes when the thrust augmentation ducts are in the rearwardly pointing flight position.

20 Claims, 8 Drawing Sheets

(56) References Cited

U.S. PATENT DOCUMENTS

| | | | |
|---|---|---|---|
| 4,193,568 A | 3/1980 | Heuvel | |
| 7,677,502 B2 * | 3/2010 | Lawson | B64C 9/18 244/207 |
| 2010/0065347 A1 | 3/2010 | Kereth | |

* cited by examiner

VERTICAL TAKE-OFF AND LANDING (VTOL) FIXED WING AIRCRAFT

CROSS REFERENCE TO RELATED APPLICATIONS

This application claims priority to Provisional Patent Application No. 62/104,902 filed Jan. 19, 2015, the entire disclosure of which is hereby incorporated by reference and relied upon.

BACKGROUND OF THE INVENTION

Field of the Invention

The invention relates generally to Vertical Take-Off and Landing (VTOL) fixed wing aircraft.

Description of Related Art

Since the early days of aviation, designers and engineers in both the commercial and military aerospace fields have envisioned fixed wing aircraft capable of taking-off from a runway no larger than its own shadow, and then transitioning to high speed forward flight. However, the reality of vertical take-off and landing (VTOL) flight for high performance commercial aircraft and military fighters has proven to be a perplexing and obsessive goal. Helicopters and autogyros, both types of VTOL non-fixed wing aircraft, are often deemed too fragile, too slow, and too vulnerable for safe air commerce and/or aerial combat.

The well-known "VTOL Wheel," produced by AHS International of Fairfax, Va. and/or its Vertipedia database, lists some forty-five various aircraft types within the broad category of VTOL capable. Within these forty-five aircraft types, one might find some fifteen various thrust options and some four different propulsion methods. To-date there has been several successful high speed military VTOL aircraft. The MD AIBAE A V-8 Harrier and the Lockheed Martin F-35 incorporate rotating jet nozzles thrust vectoring and/or lift fan technology (F-35).

Notwithstanding past and present accomplishments in the VTOL field, there is a continuing need and desire to design, develop and demonstrate a VTOL fixed wing aircraft with exceptional performance in vertical and cruise flight and operational capability through transition from vertical to forward flight. Specifically, the VTOL fixed wing aircraft should be capable of sustained high-speed flight, e.g., between ~300 kt and 400 kt. the VTOL fixed wing aircraft should be capable of hover efficiency within 25% of an ideal power loading (at standard sea level conditions) and cruise lift-to-drag ratio no less than 10. Preferably, the VTOL fixed wing aircraft should have a gross weight between 10,000 lb-12,000 lb, a useful load no less than 40% of the gross weight and a payload capacity of at least 12.5% of the gross weight.

Many such aircraft seeking to meet these design criteria utilize open-exposed rotors or propellers that rotate between VTOL and flight modes. However, there is an ever-present concern that open-exposed rotors or propellers within the human safety zone could be hazardous, and at the very least frightening. In hostile military environments, open-exposed rotors or propellers are also more vulnerable to flying metal shrapnel and small arms fire. Another downside to rotating engines or propellers is that rotation changes the thrust point. Rotating mechanisms, and the dedicated power supplies that are needed to provide the mechanical rotating transition, add significantly to center of gravity issues and make it very difficult to sustain controlled flight.

Ducted fans have also been proposed for perimeter rotating blades, however the intake (unscreened) is unfavorably referenced as a vacuum for increased foreign object debris (FOD) ingestion along with the increased drag from the circular duct detracting from horizontal flight. The applicant is not aware of any ducted fan aircraft that is able to sustain forward flight speeds greater than 270 kts.

Another downside exhibited by many current technology VTOL aircraft types relates to excessive noise. Rotor blade interaction is the result of large rotor blades interacting with retreating blades compressing airflow downward on the vertical axis cumulating a high decidable, mid-range acoustic signature that can often be heard for miles ahead of the aircraft. Furthermore, adverse Yaw tendencies are controllability issues around the Y and X axes that cause adverse gyroscopic forces from open, exposed rotor blades and propellers and engine rotation.

There is therefore a need for new and improved VTOL design solutions for fixed wing aircraft. The new and improved design solutions should retain a conventional seating arrangement and utilize a single point VTOL lift source that does not require powered cross shafting. Additionally, the new and improved design solutions should not require large exposed pivoting engines, propellers or ducted fans. Finally, the new and improved design solutions should eliminate any rotor blade interaction and adverse Yaw tendencies.

BRIEF SUMMARY OF THE INVENTION

According to a first aspect of the present invention, a vertical thrust propulsion system is provided for a Vertical Take-Off and Landing (VTOL) fixed wing aircraft. The vertical thrust propulsion system comprises and air flow plenum, a centrifugal compressor assembly, and at least one articulable thrust augmentation duct. The air flow plenum extends between a plurality of main air intakes and a plurality of main air outlets. A compressor housing is disposed between the main air intakes and the main air outlets. The compressor housing has upper and lower ends in direct fluid communication with the main air intakes. A peripheral collector is in direct fluid communication with the plurality of main air outlets. A centrifugal compressor assembly is disposed within the compressor housing. The centrifugal compressor assembly comprises upper and lower impellers disposed for counter-rotation about a generally vertical compressor axis. Each impeller has a plurality of vanes contoured to draw air through the respective upper and lower ends of the compressor housing, and to drive air radially outwardly into the peripheral collector. A drive system is operatively coupled to the upper and lower impellers for rotating the impellers about the compressor axis in opposite directions at substantially the same angular velocity. An articulable thrust augmentation duct is operatively associated with at least one of the main air outlets. The thrust augmentation duct is supported within an articulation mount that enables the thrust augmentation duct to pivot between a generally downwardly pointing VTOL position and a generally rearwardly pointing flight position. The plurality of main air intakes includes at least one VTOL mode intake and at least one flight mode intake in communication with the lower end of the compressor housing. The VTOL mode intake is configured for exposure through a leading edge of an aircraft wing, and the flight mode intake is configured for exposure through a top surface of an aircraft wing. A controller is provided for alternately closing the flight mode intake when the thrust augmentation duct is in the downwardly pointing VTOL position and closing the VTOL mode intake when the thrust augmentation duct is in the rearwardly pointing flight position.

According to a second aspect of the present invention, a VTOL fixed wing aircraft assembly is provided. The aircraft assembly comprises an airframe, an air flow plenum, a centrifugal compressor assembly, and a plurality of articulable thrust augmentation ducts. The airframe comprises a fuselage, to which at least one wing is fixedly attached. The wing has a leading edge and a trailing edge, and a top surface and a bottom surface bounded by the leading and trailing edges. The air flow plenum is contained within the airframe and extends between a plurality of main air intakes and a plurality of main air outlets. The air flow plenum includes a compressor housing disposed between the main air intakes and the main air outlets. The compressor housing has upper and lower ends in direct fluid communication with the main air intakes. The compressor housing includes a peripheral collector in direct fluid communication with the plurality of main air outlets. The centrifugal compressor assembly is disposed within the compressor housing, and comprises upper and lower impellers disposed for counter-rotation about a generally vertical compressor axis. The impellers each comprise a plurality of vanes contoured to draw air through the respective upper and lower ends of the compressor housing, and to drive air radially outwardly into the peripheral collector. A drive system is operatively coupled to the upper and lower impellers for rotating the upper and lower impellers about the compressor axis in opposite directions at substantially the same angular velocity. The articulable thrust augmentation ducts are each operatively associated with a respective one of the main air outlets. Each the thrust augmentation duct is supported within an articulation mount that enables the thrust augmentation duct to pivot between a generally downwardly pointing VTOL position and a generally rearwardly pointing flight position. The plurality of main air intakes includes at least one VTOL mode intake and at least one flight mode intake in communication with the lower end of the compressor housing. The at least one VTOL mode intake is exposed through the leading edge of the wing. The at least one flight mode intake exposed through the top surface of the wing. And a controller is provided for alternately closing the flight mode intake when the thrust augmentation duct is in the downwardly pointing VTOL position and closing the VTOL mode intake when the thrust augmentation duct is in the rearwardly pointing flight position.

All air sucked in by the lower impeller is pulled through either the flight mode intake or the VTOL mode intake. By locating the VTOL mode intake on the top surface of the wing and opening only this VTOL mode intake during VTOL operation, the intake of air will contribute to the lift of the aircraft. By locating the flight mode intake along the leading edge of the wing and opening only this flight mode intake during forward flight operation, the intake of air will contribute to the forward propulsion of the aircraft.

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF THE INVENTION

Figure 3:
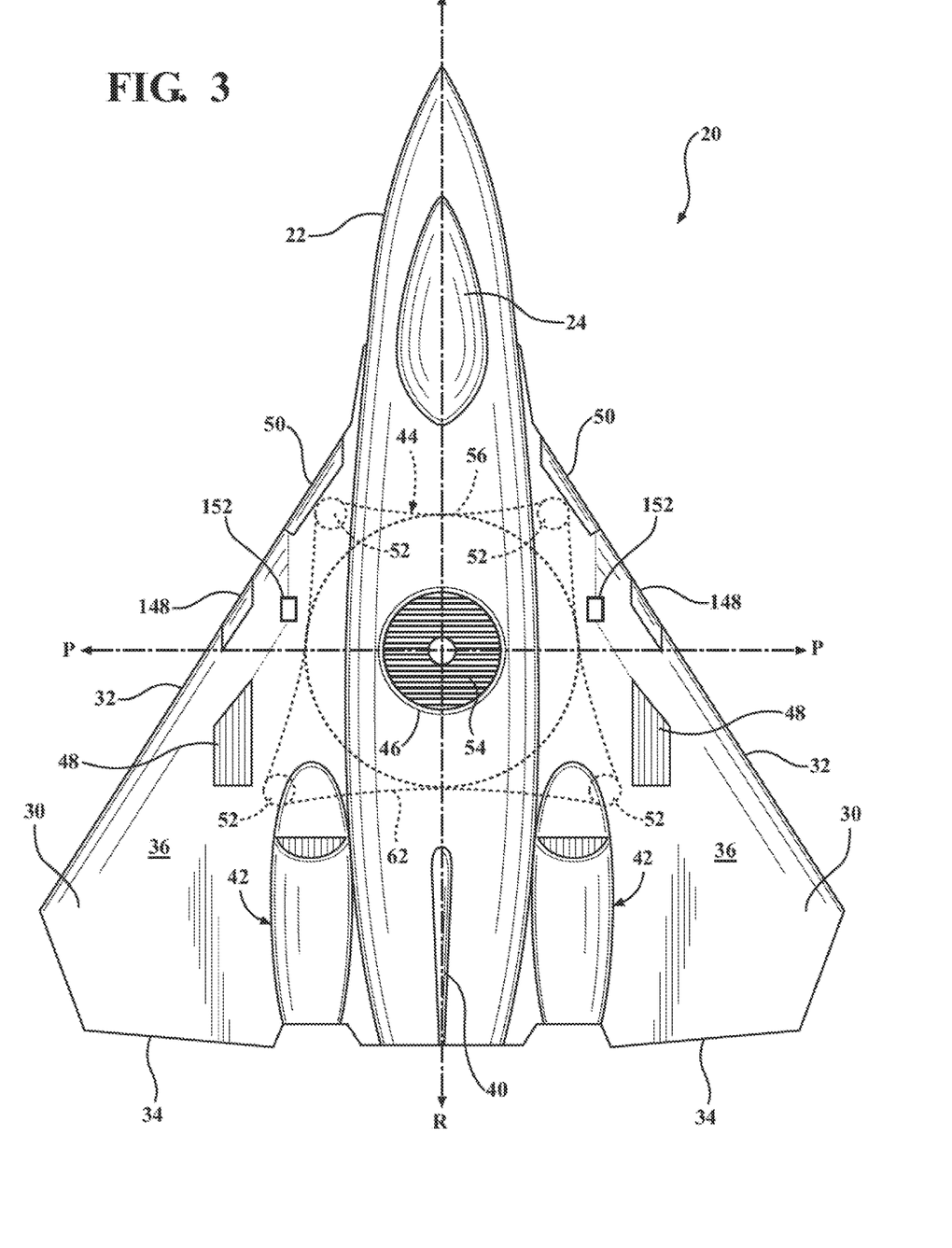
FIG. 3 is a top view of the aircraft of FIG. 1.
Figure 4:
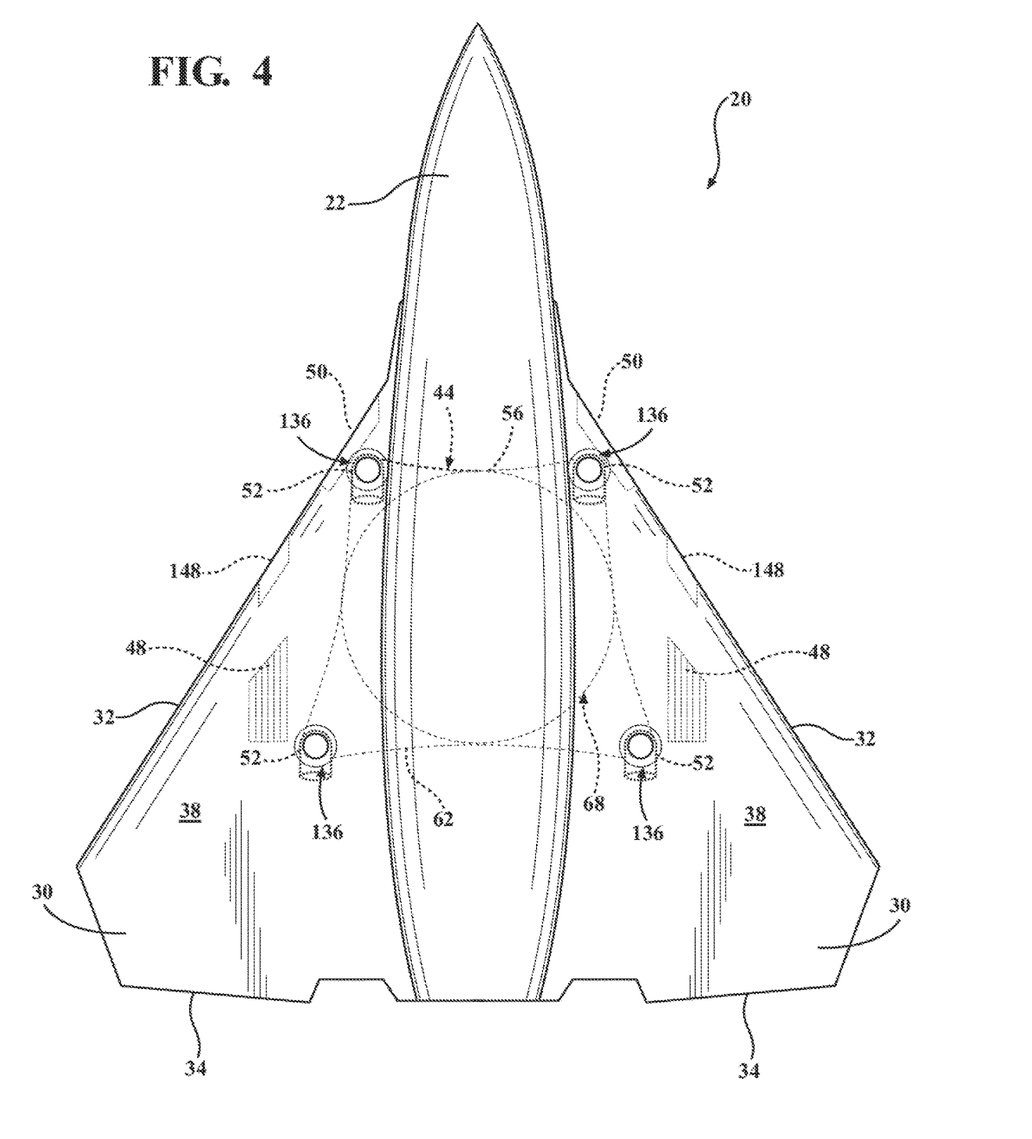
FIG. 4 is a bottom view of the aircraft of FIG. 1.
Figure 5:
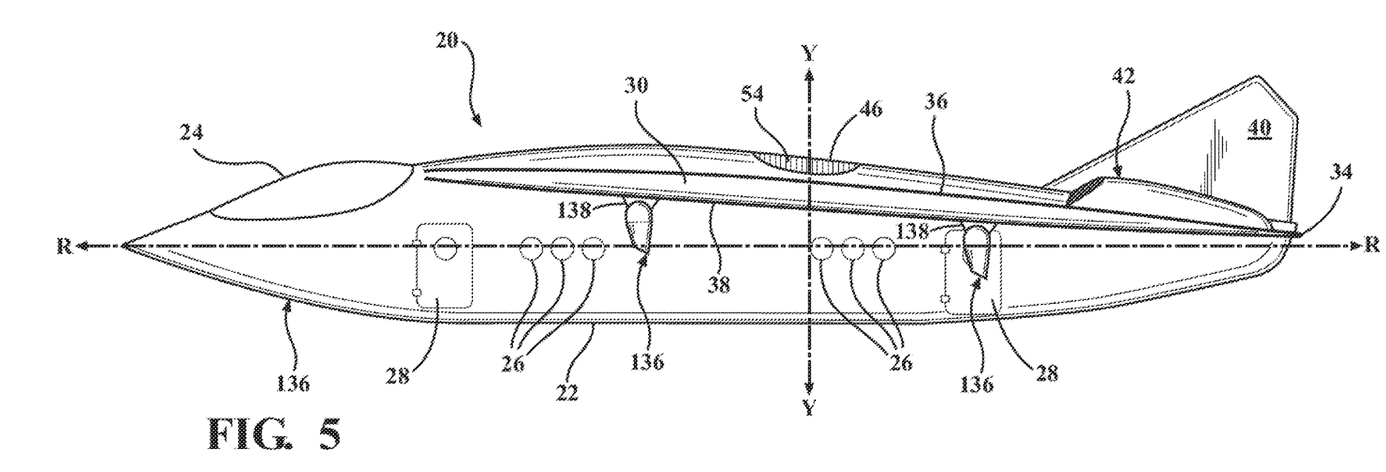
FIG. 5 is a side elevation view of the aircraft of FIG. 1 showing the thrust augmentation ducts in a downwardly pointing VTOL position.

Referring to the figures, wherein like numerals indicate like or corresponding parts throughout the several views, a Vertical Take-Off and Landing (VTOL) aircraft assembly according to one exemplary embodiment of the present invention is generally shown at 20 in FIGS. 1-6. The aircraft assembly 20 can accommodate a wide range of airframe styles and designs, it being understood that the illustrated airframe design is but one example. In this particular exemplary case, the airframe includes a generally tubular fuselage which is generally indicated at 22. A cockpit is disposed within the fuselage 22, typically near to the nose of the aircraft. The cockpit has a transparent canopy 24. In certain contemplated unmanned variations, i.e., drones, the cockpit may be omitted. FIG. 5, a simplified exterior elevation view, depicts a fuselage 22 that is large enough to support a cargo area. In this view, a plurality of viewing ports, or windows, 26 are disposed in the fuselage 22, along with two cargo doors 28. Naturally, the fuselage 22 shown in the accompanying illustrations is provided merely as one example.

One or more wings 30 are fixedly attached to the fuselage 22. The one or more wings 30 have an airfoil shape so as to generate lift when subjected to forward airspeed. The one or more wings 30 can take any suitable shape or design. In the illustrated examples, a delta-wing construction is shown having separate left and right wing portions. Each wing 30 has a leading edge 32 and a trailing edge 34. Each the wing 30 has a top surface 36 and a bottom surface 38 bounded by the leading 32 and trailing 34 edges. Generally, the airfoil shape of the wings 30 is defined by the respective curvatures of the top 36 and bottom 38 surfaces. In non-delta wing designs, horizontal stabilizers may be required. The wings 30 are fitted with convention control surfaces, e.g., ailerons and flaps.

A rudder, or tail fin, 40 may be attached to the fuselage 22. The tail fin 40 may be of the common type extending generally perpendicularly relative to the wings 30, as shown in these views. Alternative designs are also possible, including twin boom designs and V-tail designs to name but a few. Some contemplated embodiments of the invention omit the tail fin 40 altogether. Although not shown, the airframe will also include some form of undercarriage. Any suitable type of undercarriage can be incorporated into the concepts of this invention. In some cases, it may be preferred to incorporate an undercarriage that is suited for horizontal motion, such as in conventional fixed-wing aircraft take-off and landing.

The aircraft 20 in flight is free to rotate in three dimensions which are generally referred to as pitch, yaw and roll. Pitch refers to nose up or down about a transverse or lateral axis P. Yaw refers to nose left or right about a vertical axis Y. Roll refers to rotation about a longitudinal axis R running from nose to tail through the fuselage 22. The axes P-Y-R move with the aircraft 20 in flight. When the control surfaces of the wings 30 and/or tail fin 40 are manipulated, the aircraft 20 will adjust its trajectory about a combination of the P-Y-R axes.

The aircraft assembly 20 includes a forward thrust propulsion system, generally indicated at 42. The forward thrust propulsion system 42 may take any of a number of possible forms. The particular form illustrated in FIGS. 1-3 and 5 is that of two turbo fan engines, one each disposed on the respective left and right wings 30 near their trailing edges 34 and close to the fuselage 22. The turbo fan engines in this case may be operatively associated with a re-direct exhaust flow bucket, as is well known in the art. However, it will be appreciated that the forward thrust propulsion system 42 could take any number of different forms, including propellers, turbojets, ramjets and rockets to name but a few. It is contemplated that the forward thrust propulsion system 42 provides the primary, but not the exclusive, means for achieving forward airspeed.

A novel vertical thrust propulsion system is provided for enabling vertical take-off and landing of the aircraft 20. The vertical thrust propulsion system includes an air flow plenum 44. Preferably, the plenum 44 is disposed entirely, or at least substantially, within the airframe. However, some contemplated embodiments have an externally supported plenum 44. The plenum 44 extends between a plurality of main air intakes 46, 48, 50 and a plurality of main air outlets 52. That is to say, air enters the plenum 44 via the main air intakes 46-50 and moves through toward the main air outlets 52. In the preferred embodiments of this invention, the plenum 44 takes in ambient air at atmospheric pressure (via the main air intakes 46-50) and discharges air at elevated pressure and velocity back into the atmosphere through the main air outlets 52. In so doing, the vertical thrust propulsion system produces thrust, which is the reaction force described quantitatively by Newton's second and third laws. I.e., the vertical thrust propulsion system expels or accelerates a mass flow of air which exerts a force of equal magnitude but opposite direction on the airframe.

Continuing still with the plenum 44 portion of the vertical thrust propulsion system, the plurality of main air intakes includes a central intake 46, and several outlier intakes 48, 50. The central intake 48 is preferably disposed along the top of the fuselage 22, centrally and generally mid-way between the cockpit canopy 24 and the tail fin 40. The central intake 48 may be generally round, at least in top view, and in some embodiments is generally centered on the yaw axis Y. However, other locations along the airframe are possible. The top side of the airframe is nevertheless preferred to take advantage of the lift generated by the rapid draw of air into the central intake 48.

Figure 1:
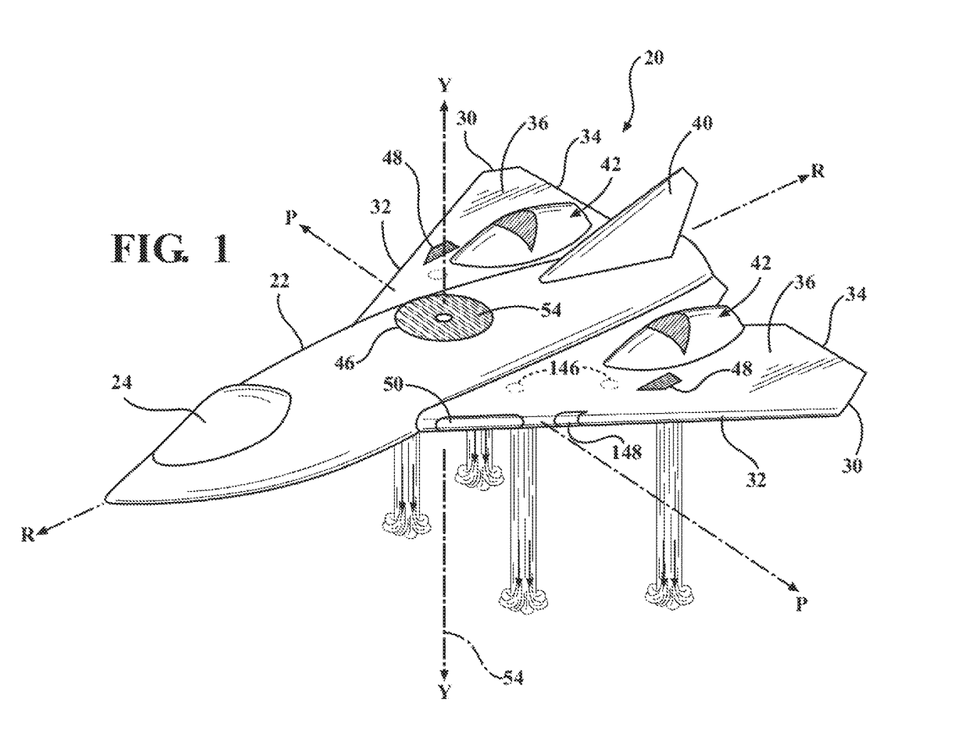
FIG. 1 is a perspective view of an aircraft according to one exemplary embodiment of this invention in VTOL mode.
Figure 2:
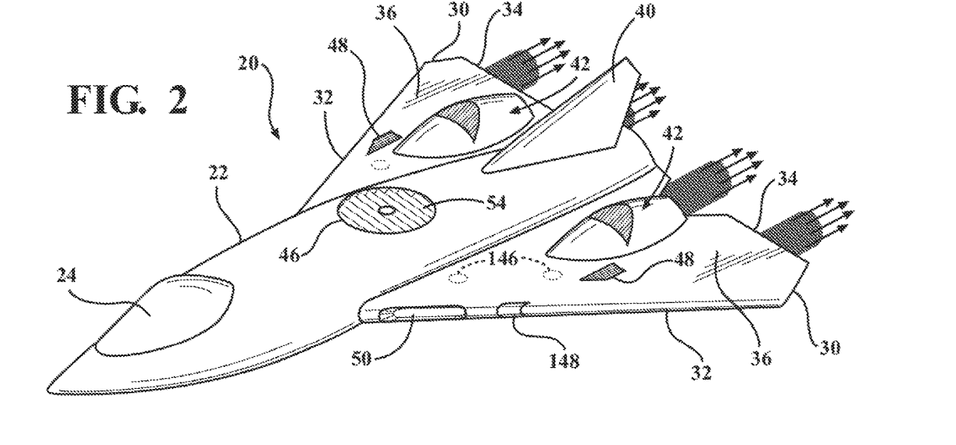
FIG. 2 is a perspective view of the aircraft of FIG. 1 in forward flight mode.

Louvers 54 may extend across the central intake 46. In the illustrated examples, the louvers 54 are set generally parallel to the pitch axis P. The louvers 54 may be adjustable between at least a forward tilting condition (FIG. 1) and a rearward tilting condition (FIG. 2). The forward tilting condition might be preferred during vertical take-off and landing operations (FIG. 1), whereas the rearward tilting condition may be preferred during horizontal flight (FIG. 2). In some contemplated embodiments, the louvers 54 may be supported in a rotatable frame that will enable up to 360° rotation, which could potentially be useful in controlling ascent and decent of the aircraft 20 during VTOL. That is to say, the pulling action generated by the rapid draw of air into the central intake 46 can be vectored to a degree by the louvers 54, which in turn can be used for a modest degree of VTOL flight control.

The plurality of outlier intakes 48, 50 include at least one VTOL mode intake 48 and at least one flight mode intake 50. In the illustrated embodiments, one VTOL mode intake 48 and one flight mode intake 50 are provided on each wing 30. The flight mode intake 50 is exposed through the leading edge 32 of each of wing 30, preferably but not necessarily near the wing root adjacent the fuselage 22. The VTOL mode intake 48, on the other hand, is exposed through the top surface 36 of each wing 30, preferably but not necessarily at some distance from the fuselage 22. The functionality of these outlier intakes 48, 50 will be discussed below.

The plenum 44 portion of the vertical thrust propulsion system further includes a compressor housing 56. The compressor housing 56 is disposed between the main air intakes 46-50 and the main air outlets 52. That is to say, the compressor housing 56 is a somewhat enlarged region in the middle of the plenum 44. Air flowing through the plenum 44 passes through the compressor housing 56. Preferably, the compressor housing 56 is generally centered upon the point of intersection between the P-Y-R axes. If not centered, preferably the point of intersection between the P-Y-R axes is located somewhere within the volume of the compressor housing 56. In other contemplated embodiments, only one or perhaps two of the P-Y-R axes pass through the compressor housing 56. And in some contemplated embodiments, the compressor housing 56 does not intersect any of the P-Y-R axes.

Figure 6:
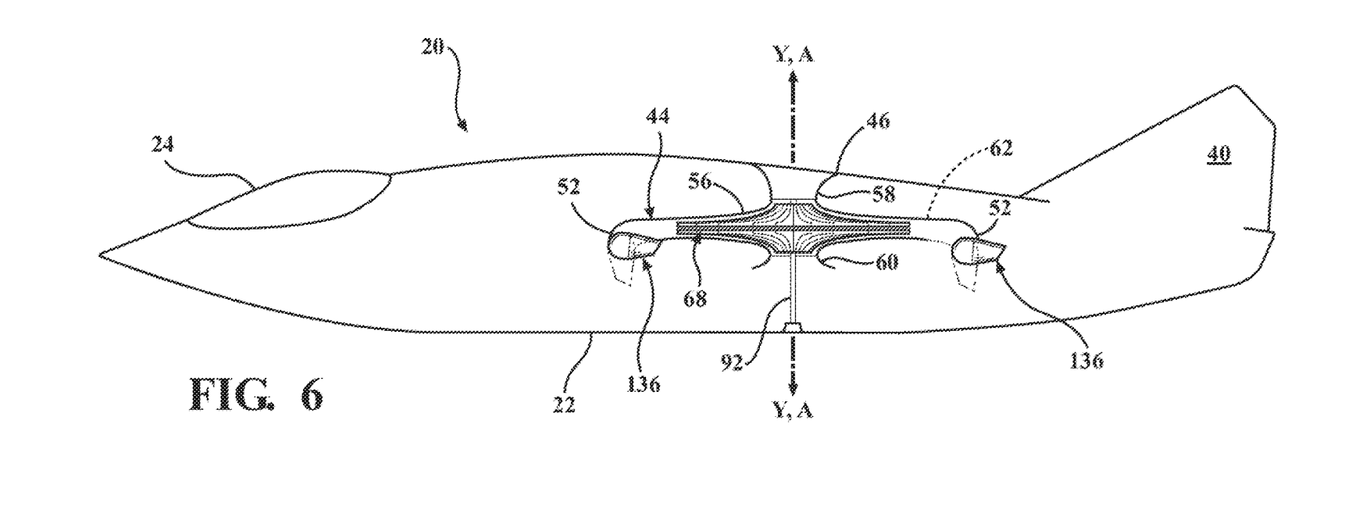
FIG. 6 is a highly simplified interior view of the aircraft to expose the centrifugal compressor assembly in cross-section and showing the thrust augmentation ducts in rearwardly pointing flight position.
Figure 7:
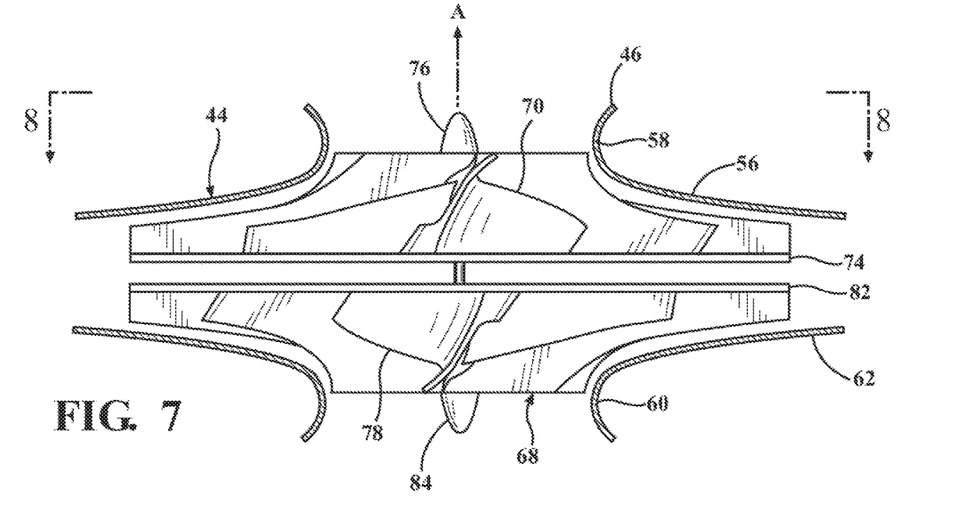
FIG. 7 is a fragmentary cross-section view though the compressor housing to expose the upper and lower impellers according to one exemplary embodiment of this invention.

The compressor housing 56 has upper 58 and lower 60 ends, as perhaps best shown in FIGS. 6 and 7. The upper end 58 is in direct fluid communication with the central intake 46. The lower end 60 of the compressor housing 56 is in direct fluid communication with the outlier intakes 48, 50. Air therefore flows into the compressor housing 56 from two axial directions via its upper 58 and lower 60 ends. The incoming air converges within the compressor housing 56 and its flow is turned outwardly (i.e., at right angles) into a peripheral manifold or collector 62. The peripheral collector 62 may take any convenient form, including toroidal, spiral or spoke-like to name but a few. In the illustrated embodiments, however, the peripheral collector 62 has a generally quadrilateral shape defined by four discharge corners 64, 66.

As shown in FIG. 7, the discharge corners 64, 66 may be arranged in an isosceles trapezoid pattern with two narrowly-spaced front corners 64 and two widely-spaced rear discharge corners 66. Each of the front 64 and rear 66 discharge corners are in direct fluid communication with the plurality of main air outlets 52, as will be described subsequently. The plan views of FIGS. 3 and 4 illustrate that in some embodiments, the peripheral collector 62 may partially extend into the inner regions of the wings 30.

The vertical thrust propulsion system includes a centrifugal compressor assembly, generally indicated at 68. The centrifugal compressor assembly 68 is disposed, at least partially, within the compressor housing 56 of the plenum 44. The centrifugal compressor assembly 68 is a type of radial compressor, which achieves a pressure rise in the air by adding kinetic energy/velocity to a continuous flow entering through the main air intakes 46-50. The centrifugal compressor assembly 68 is preferably of the double-entry type, designed to admit air flow from two (top and bottom) directions. The centrifugal compressor assembly 68 includes an upper impeller 70 disposed for rotation in one direction about a generally vertical compressor axis A. As perhaps best shown in the top view of FIG. 8, the circular footprint of the upper impeller 70 is closely spaced from the sides of the compressor housing 56. That is to say, the upper impeller 70 substantially fills the inside space of the generally trapezoidal peripheral collector 62 to establish four spoke-like manifold fingers leading to the respective discharge corners 64, 66. To emphasize and further improve air flow efficiency, the sides of the peripheral collector 62 may gracefully curve inwardly toward the upper impeller 70, which curving will be even more pronounced in cases where the discharge corners 64, 66 are located especially distant.

In the illustrated embodiments, the compressor axis A is generally aligned with the yaw axis Y and passes through the center of the central intake 46. In other contemplated embodiments, the compressor axis A is generally parallel to the yaw axis Y but not coincident therewith. In other contemplated embodiments, the compressor axis A is aligned with or at least generally parallel to the roll axis R, or aligned with or generally parallel to the pitch axis P.

Figure 8:
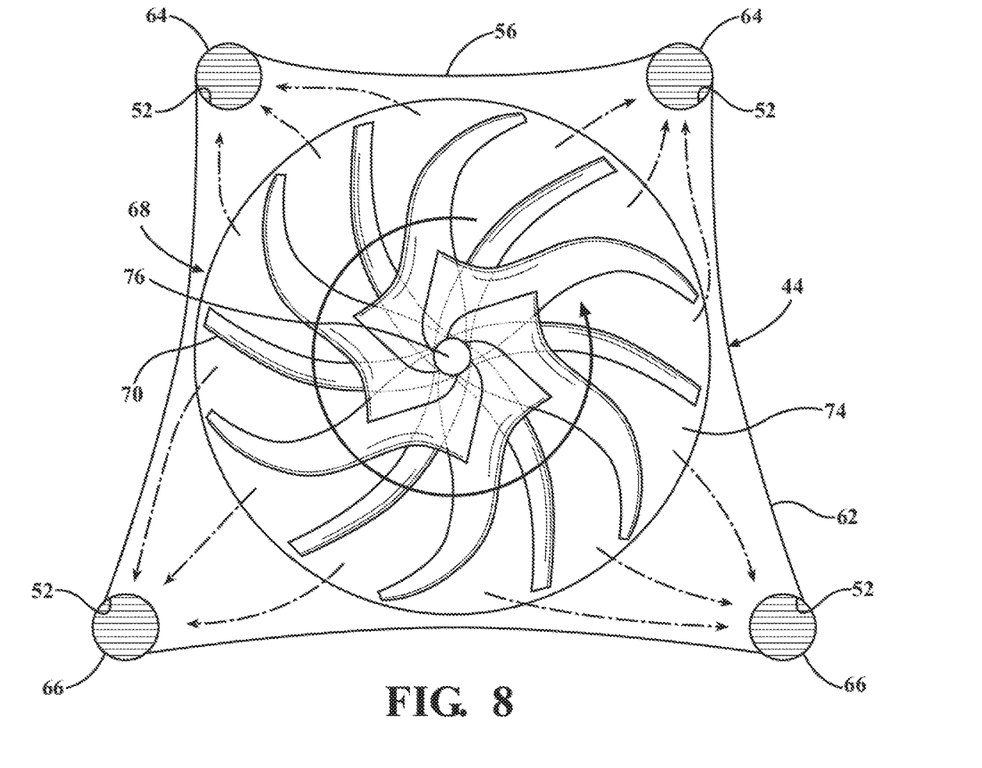
FIG. 8 is a top view of the centrifugal compressor assembly as taken, generally, along lines 8-8 of FIG. 7 and depicting the peripheral collector portion of the plenum system.
Figure 9:
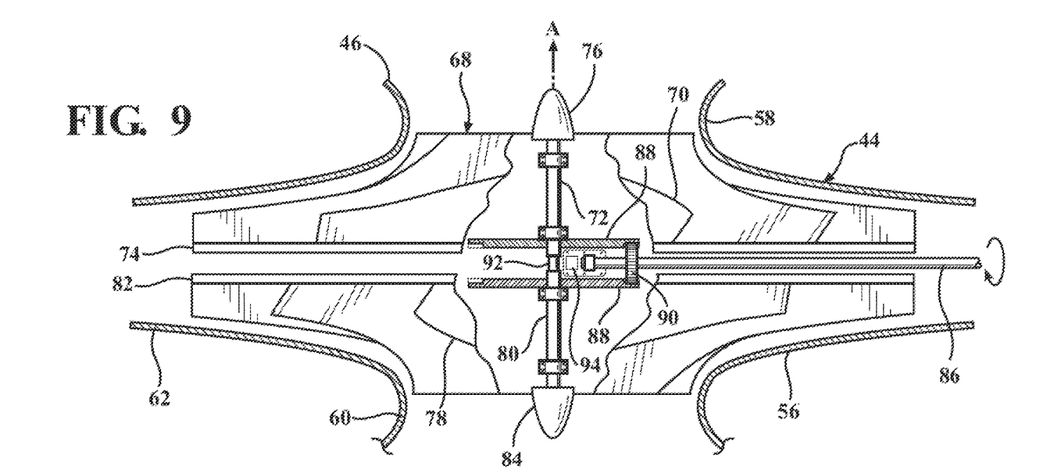
FIG. 9 is a simplified front elevation view of the centrifugal compressor assembly and showing a first alternative embodiment drive system.

The upper impeller 70 comprises a plurality of upper vanes supported upon an upper shaft section 72 (FIG. 9). The upper vanes are contoured, as shown in FIGS. 7 and 8, to draw air through the central intake 46 and then drive the air radially outwardly into the peripheral collector 62. An upper base plate 74 covers the bottoms of the upper impeller vanes to help turn the airflow toward the peripheral collector 62. The upper base plate 74 supports the upper vanes and is commonly attached therewith to the upper shaft section 72. An upper spinner 76 may be attached to the upper shaft section 72 to help divert incoming airflow toward the leading edges of the upper vanes. An exemplary prior art impeller similar in some respects to the upper impeller 70 may be seen in the Napier NA357 "7 Series" centrifugal compressor, available from Napier Turbochargers Limited in the United Kingdom.

Likewise, a lower impeller 78 is disposed adjacent the upper impeller 70 for counter-rotation about the same compressor axis A. The lower impeller 78 may be a mirror-image of the upper impeller 70 by including a plurality of lower vanes supported upon a lower shaft section 80. The lower vanes are contoured to draw air through the plurality of outlier intakes 48, 50. That is to say, the upper impeller 70 draws air in through the central intake 46, whereas the lower impeller 78 draws air in through the VTOL mode intake 48 and/or the flight mode intake 50. Preferably, the fluid flow characteristics through the central intake 46 are generally equivalent to the fluid flow characteristics through the outlier intakes 48, 50 so that both impellers 70, 78 can receive a generally equal flow rate of air in use. The shape of the lower vanes drives the air received from the outlier intakes 48, 50 radially outwardly into the peripheral collector 62. A lower base plate 82 supports the lower vanes and is commonly attached therewith to the lower shaft section 80. The lower shaft section 80 includes a lower spinner 84, as perhaps best shown in FIG. 7.

A drive system is operatively coupled to the upper 70 and lower 78 impellers for rotating the upper 70 and lower 78 impellers about the compressor axis A in opposite directions at substantially the same angular velocity. The unique construction attributes of the present invention enable numerous options for the drive system. Indeed, the teachings of this present invention enable the aircraft 22 to perhaps incorporate two or more different types of drive systems to provide redundancy, multiplied power input, or alternative fuels. Furthermore, the unique construction attributes of the present invention enable some degree of placement flexibility for the drive system within the airframe to better utilize space, distribute weight or for other design purposes. FIGS. 9-12 illustrate four of the many different types of drive systems that can be used to rotate the upper 70 and lower 78 impellers about the compressor axis A in opposite directions at substantially the same angular velocity.

Referring first to FIG. 9, the drive system in this example includes a drive shaft 86 disposed between the upper 70 and lower 78 impellers, extending generally perpendicular to the compressor axis A. A suitable motor or engine of any conventional type (not shown) rotates the drive shaft. The drive shaft 86 is preferably located either parallel to the roll axis R or parallel to the pitch axis P, and may extend in-between any two discharge corners 64, 66 exiting through the shell of the compressor housing 56. As such, the driving motor/engine can be located almost anywhere in the airframe outside the compressor housing 56. In this example, each of the upper 74 and lower 80 base plates are fitted with respective ring gears 88. The ring gears 88 may be incorporated into respective thrust rings. The drive shaft 86 has a pinion gear 90 that operatively engages the respective ring gears 88. That is, the pinon gear 90 rotates with the drive shaft 86 and simultaneously meshes with each of the ring gears 88, cause each ring gear to rotate in an opposite direction. The ring gears 88 are attached to the respective base plates 74, 80 and thereby cause the upper 70 and lower 78 impellers to counter-rotate at substantially the same angular velocity.

FIG. 9 also illustrates the possibility of a main shaft 92 supported in bearings within the respective upper 72 and lower 80 shaft sections. The main shaft 92 may extend downwardly, exiting through the bottom of the compressor housing 56 where it is attached to a suitable support inside the airframe, as suggested in FIG. 6. In this manner, the entire centrifugal compressor assembly 68 may be supported within the airframe. A tie-in coupler 94 may be used to rotatable attach the end of the drive shaft 86 to the main shaft 92 for added structural integrity.

In some contemplated embodiments, two or three or four such drive shafts 86 may be operatively engaged to the ring gears 88, such as entering along any of the 12-3-6-9 o'clock positions as viewed from FIG. 8. In multiple drive shaft arrangements, it may be desirable to provide redundancy in case one driving motor/engine should fail, a back-up motor/engine is available to continue operating the centrifugal compressor assembly 68. Alternatively, it may be desirable to provide multiple driving motors/engines, each operating through a respective drive shaft 86, in order to multiple the power input. In cases where two driving motors/engines are used, they can each be of roughly one-half the power rating and presumably of a smaller physical size and weight which could be advantageous for packaging purposes or weight distribution purposes. In cases where four driving motors/engines are used, they can each be of roughly one-quarter the power rating and yet smaller still in size and weight. And so forth. Yet another motivation to utilize multiple driving motors/engines, each operating through respective drive shafts 86, might be to take advantage of alternative fuels. For example, an aircraft 22 fitted with a drive system according to FIG. 9 and utilizing multiple driving motors/engines, each operating through respective drive shafts 86, might configure one driving motor/engine to be an electric motor. Another driving motor/engine might be of an aviation grade internal combustion engine. Another driving motor/engine might be of yet another type or operate on a third fuel type. There are, therefore, many advantages to utilizing multiple driving motors/engines, each operating through respective drive shafts 86.

Figure 10:
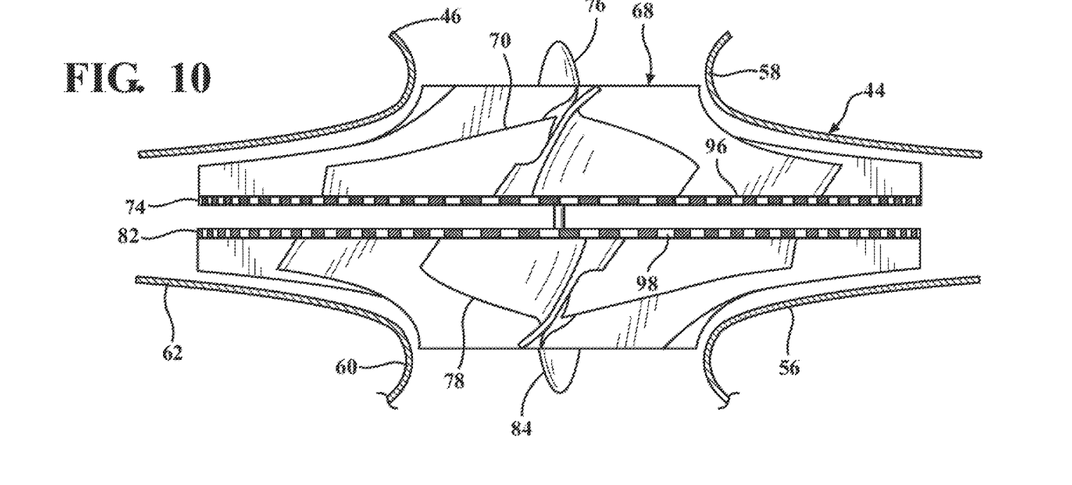
FIG. 10 is a simplified front elevation view of the centrifugal compressor assembly and showing a second alternative embodiment drive system.

FIG. 10 illustrates another alternative embodiment for the drive system, either distinct from or combined with the drive shaft 88 embodiment of FIG. 9. In this example, the drive system comprises a direct drive counter-rotating electric motor that utilizes the opposing base plates 74, 82 to support the respective armature 96 and stator 98 portions of a counter-rotating electric motor. The general principles of counter-rotating electric motors are known in the art, including such examples as U.S. Pat. No. 2,462,182 to Guerdan et al., issued Feb. 22, 1949, U.S. Pat. No. 3,267,311 to Lamparty, issued Aug. 16, 1966 and US Publication No. 2010/0065347 to Kereth, published Mar. 18, 2010, the entire disclosures of which are hereby incorporated by reference and relied upon.

The armature portion 96 is shown in FIG. 10 as being associated with the upper base plate 74, however it is to be understood that the armature 96 can be operatively attached to either one of the upper 74 and lower 82 base plates. Likewise, the stator 98 is shown as part of the lower base plate 82, but could be operatively attached to either base plate 74, 82. Preferably, but not necessarily, the direct drive motor configuration may take the form of a so-called pancake motor in which the magnets and windings are shaped as a disc with space in between to form an axial air gap. This design provides an extremely flat profile which is suitable to the double-entry type centrifugal compressor assembly 68. Many alternative construction techniques are known for pancake motors, and can be applied here within the ordinary level of skill in the field. For examples, the armature 96 may be printed, like a circuit board, directly onto the upper base plate 74, or made from punched copper sheets that are laminated together and subsequently adhered to the upper base plate 74. A separate ring commutator may be omitted in these instances, with the brushes running directly on the armature surface. Alternatively, wound copper wire can be laid flat with a central conventional commutator, in a flower and petal shape. Many other alternatives are of course possible beyond those mentioned here.

Figure 11:
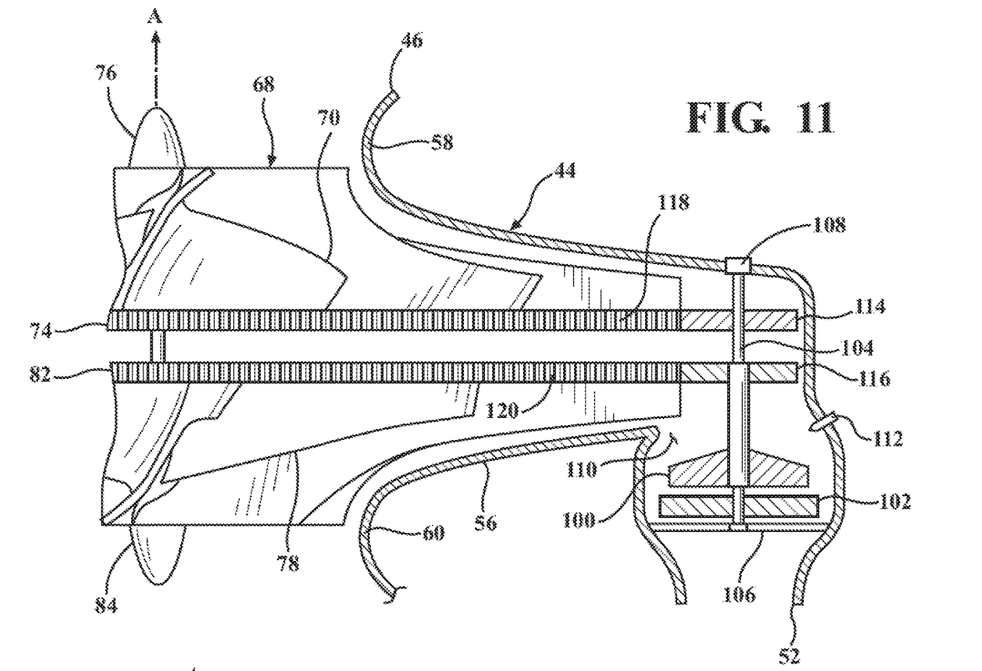
FIG. 11 is a simplified front elevation view of the centrifugal compressor assembly and showing a third alternative embodiment drive system.

FIG. 11 shows yet another alternative embodiment for the drive system. In this example, the drive system includes a combustion turbine, in the form of co-axial counter-rotating turbine wheels 100, 102, disposed within the air flow plenum 44. The counter-rotating turbine wheels 100, 102 are located in the flow path between one of the discharge corners 64, 66 and its respective main air outlet 52. It is contemplated that more than one set (i.e., up to four sets) of counter-rotating turbine wheels 100, 102 can be concurrently used to drive the impellers 70, 78, each associated with a respective one of the discharge corners 64, 66. The counter-rotating turbine wheels 100, 102 are supported, co-axially, on a dual shaft 104. The dual shaft 104 has an inner, or core, shaft and an outer sleeve, both of which are rotatable with respect to the other. One of the turbine wheels 102 is fixedly attached to the inner shaft portion and the other turbine wheel 100 is attached to the sleeve. One end of the inner shaft portion of the dual shaft 104 may be supported in the plenum 44 by a shaft stabilizer 106, which may take the form of a flow-through spoke-and-hub member attached just upstream of the main air outlet 52. The other end of the inner shaft portion of the dual shaft 104 may be supported in the plenum 44 in a simple end cap bearing 108. In this manner, the inner shaft portion of the dual shaft 104 is free to rotate with the one turbine wheel 102, and the sleeve portion of the dual shaft 104 is free to rotate with the other turbine wheel 100. A combustion chamber 110 is formed in the plenum 44 upstream of the counter-rotating turbine wheels 100, 102. One or more fuel injectors 112 may be positioned in the combustion chamber 110, together with one or more suitable igniters (not shown). When fuel is injected into the compressed air flow passing through the combustion chamber 110, the expanding combustion gasses will travel through the counter-rotating turbine wheels 100, 102 and drive each, together with their associated portions of the dual shaft 104, in opposite rotary directions.

A first pinion gear 114 is attached to the inner shaft portion of the dual shaft 104. A second pinion 116 gear is attached to the sleeve portion of the dual shaft 104. The radially outer edge of the upper base plate 74 is formed with a ring gear 118. The ring gear 118 is meshed with the first pinion gear 114. Similarly, the radially outer edge of the lower base plate 82 is formed with a ring gear 116, which meshes with the second pinion gear 116. As each turbine wheel is rotated by the expanding combustion gases, the associated pinions 114, 116 are forcibly counter-rotated, which in turn drives the impellers 70, 78 in opposite directions.

Although FIG. 11 shows the dual shaft 104 stabilized parallel to the compressor axis A, it will be appreciated that the pinions 114, 116 could be formed as bevel gears in cases where it is desired that the dual shaft 104 be located on an angle, such as jutting at an outward slant. It also bears mentioning that the combustion chamber embodiment of FIG. 11 can be used in combination with any one or both of the preceding drive system embodiments of FIGS. 9 and 10.

Figure 12:
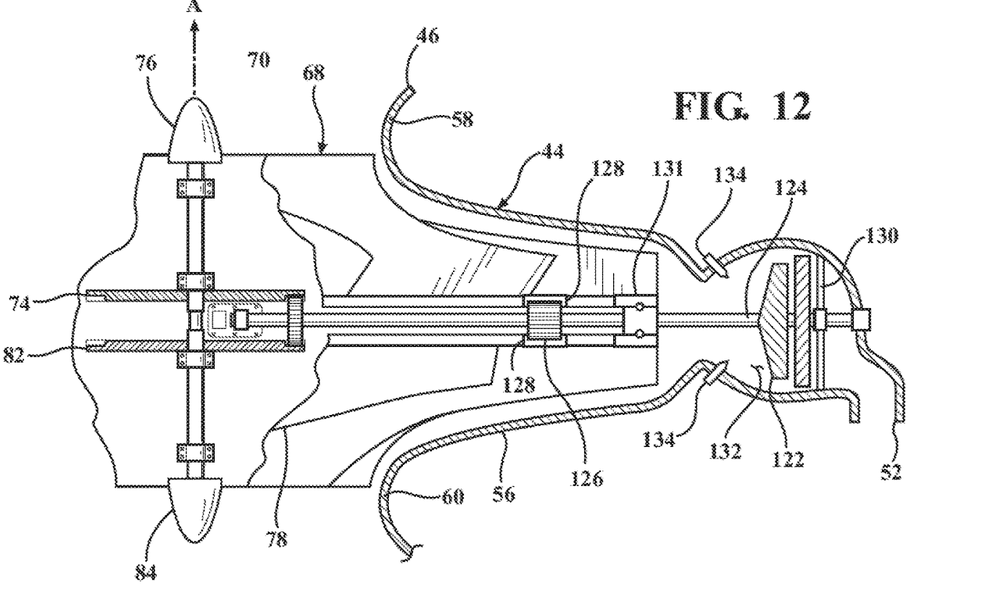
FIG. 12 is a simplified front elevation view of the centrifugal compressor assembly and showing a fourth alternative embodiment drive system.

FIG. 12 shows a still further alternative embodiment for the drive system. In this example, the drive system includes a combustion turbine, in the form of a single turbine blade 122 disposed within the air flow plenum 44. The one turbine blade 122 is supported on a drive shaft 124 which may be compared somewhat to the drive shaft 86 of FIG. 9. At least one pinion gear 126 is disposed on the end of the drive shaft 124, in direct meshing engagement with ring gears 128 attached to each of the upper 74 and lower 82 base plates. One end of the drive shaft 124 may be supported in the plenum 44 by a shaft stabilizer 130, which may take the form of a flow-through spoke-and-hub member attached just upstream of the main air outlet 52. An interstitial, most likely tapered, roller bearing 131 may be located between the drive shaft 124 and the respective base plates 74, 82. A combustion chamber 132 is formed in the plenum 44 upstream of the turbine blade 122. One or more fuel injectors 134 may be positioned in the combustion chamber 132, together with one or more suitable igniters (not shown). When fuel is injected into the compressed air flow passing through the combustion chamber 132, the expanding combustion gasses will travel through the turbine blade 122 and drive the shaft 124. Its pinion 126 will simultaneously drive each impeller 70, 78 in opposite rotary directions. The combustion chamber embodiment of FIG. 12 can be used in combination with any one or both of the preceding drive system embodiments of FIGS. 9, 10 and 11.

Figure 13:
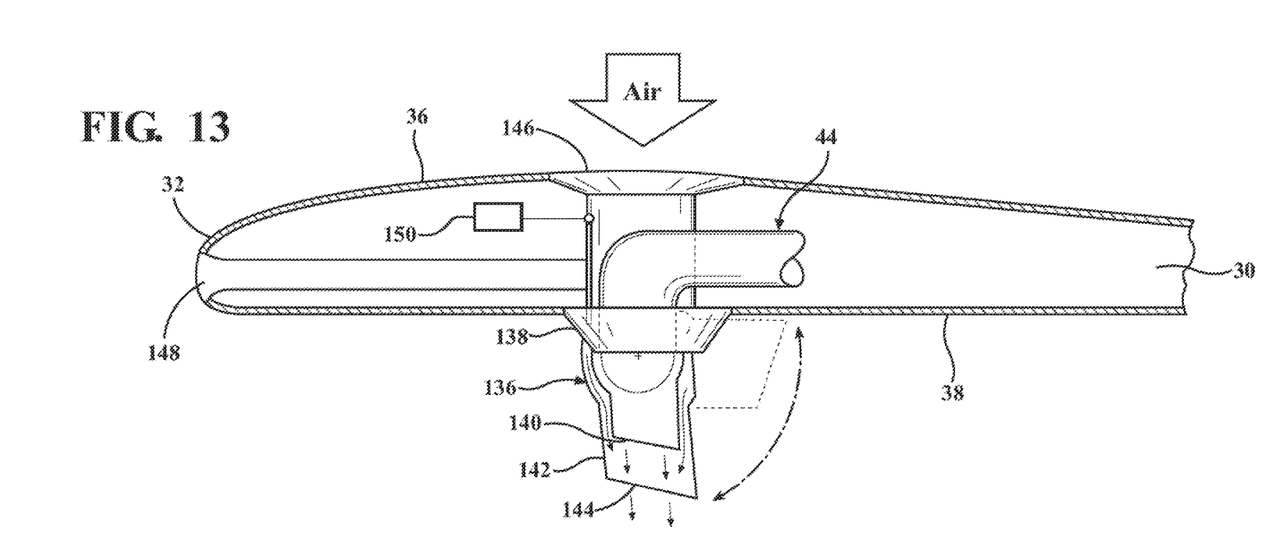
FIG. 13 is a simplified and fragmentary cross-section through a wing of the aircraft schematically illustrating the natural aspiration of bypass air into the thrust augmentation duct when in a downwardly pointing VTOL position.
Figure 14:
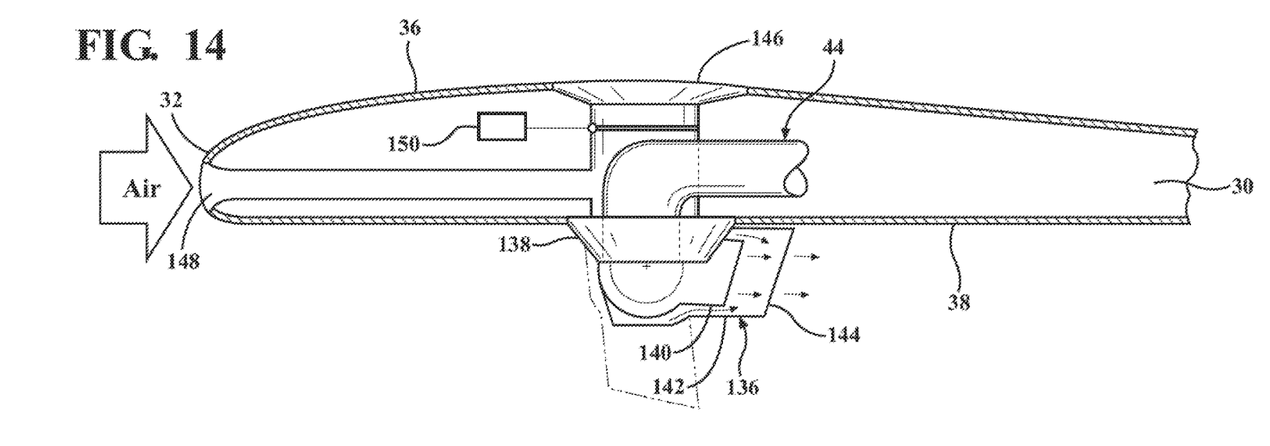
FIG. 14 is a view as in FIG. 13 but showing the natural aspiration of bypass air into the thrust augmentation duct when in a rearwardly pointing flight position.

Turning now to FIGS. 13 and 14, an articulable thrust augmentation duct is generally indicated at 136. In the preferred embodiment, one thrust augmentation duct 136 is operatively associated with each main air outlet 52, and serves to direct or vector the mass air flow emanating from the plenum 44. However, some contemplated embodiments of this invention may utilize one or more main air outlets 52 without an associated thrust augmentation duct 136. As perhaps best seen in the bottom view of FIG. 4, the illustrated embodiment has four main air outlets 52 (one for each discharge corner 64, 66), and therefore four thrust augmentation ducts 136.

Each thrust augmentation duct 136 is supported within an articulation mount 138 feature of the airframe, and preferably below the wings 30 or below the fuselage 22. The articulation mounts 138 enable the thrust augmentation duct 136 supported therein to pivot between a generally downwardly pointing VTOL position (FIG. 13) and a generally rearwardly pointing flight position (FIG. 14). The degree of angular adjustment is preferably at least about 85°, with the rearwardly pointing flight position being designated as about 90° from vertical and the downwardly pointing VTOL position being designated as about 185° from vertical. Of course, other ranges of motion are possible. It is also contemplated that is some embodiments, the articulation mounts 138 also provide a degree of rotation about a vertical axis so that the thrust augmentation ducts 136 can not only pivot up and down, but also swing from side-to-side.

In the downward pointing position, the exiting mass flow of air is directed downwardly, which has the effect of exerting an upwardly directed reaction force on the airframe which induces the aircraft 20 to rise. In the rearward pointing direction, the mass flow of air is directed rearwardly, which has the effect of exerting a forwardly directed reaction force on the airframe. It is envisioned that the thrust augmentation ducts 136 will be directed downwardly during VTOL operations, and directed rearwardly during forward flight. The above-mentioned forward thrust propulsion system 42 will action in concert with the rearwardly directed thrust augmentation ducts 136 during normal forward flight to achieve the airspeeds necessary to avoid stall.

FIGS. 13 and 14 show the thrust augmentation duct 136 in a semi cross-sectional manner so as to reveal a central nozzle 140. The central nozzle 140 is in direct communication with the corresponding main air outlet 52 of the plenum 44. All air exiting through a main air outlet 52 passes through the central nozzle 140. These views also show that the thrust augmentation duct 136 includes a bypass sleeve 142 that is disposed around the central nozzle 140. An air gap is formed in the space between the bypass sleeve 142 and the central nozzle 140. Each bypass sleeve 142 has a terminal end 144 that extends past the central nozzle 140. The terminal end 144 is preferably scalloped, or slanted, as shown in the figures.

A plurality of augmentation air intakes 146, 148 feed air to the air gap formed between each bypass sleeve 142 and its central nozzle 140. The augmentation air intakes 146, 148 include at least one wing-top augmentation intake 146 and at least one leading edge augmentation intake 148. These augmentation air intakes 146, 148 are shown schematically in FIGS. 13 and 14. Whereas, in FIGS. 1-3 the augmentation air intakes 146, 148 are shown in specific proposed/exemplary positions. The bypass sleeve 142 is configured to naturally aspirate air from the wing-top augmentation intake 146 when the thrust augmentation duct 136 is in the downwardly pointing VTOL position (FIG. 13). And conversely, the bypass sleeve 142 is configured to naturally aspirate air from the leading edge augmentation intake 148 when the thrust augmentation duct 136 is in the rearwardly pointing flight position (FIG. 14). Natural aspiration is accomplished with a Venturi-like effect. The compressed, high velocity air flow passing through the central nozzle 140 creates a negative pressure, or vacuum, in the air gap between the bypass sleeve 142 and the central nozzle 140. This vacuum draws air from either the wing-top augmentation intake 146 or the leading edge augmentation intake 148.

An augmentation valve 150 may be incorporated for selectively closing the leading edge augmentation intake 148 when the thrust augmentation duct 136 is in the downwardly pointing VTOL position, and for closing the wing-top augmentation intake 146 when the thrust augmentation duct 136 is in the rearwardly pointing flight position. Thus, during vertical take-off and landing bypass air is aspirated from the wing-top augmentation intake 146, which aspiration has a two-fold effect. For one, the suction caused by the aspiration provides a modest additional lift to the airframe. For another, the additional air entrained with the main outflow of air magnifies the mass of air, which in turn produces a larger reaction force to lift the aircraft 20 during VTOL. Similarly, in forward flight mode, the bypass air is aspirated from the leading edge augmentation intake 148, having a similar beneficial two-fold effect to amplify forward propulsion of the aircraft 20. The augmentation valve 150 is shown schematically in FIGS. 13 and 14 in the form of a flapper door or gate. However, it is to be understood that the augmentation valve 150 could take many different forms, including closeable louvers or doors at the entrance to each of the augmentation air intakes 146, 148, as one example. In another example, the augmentation valve 150 could take the form of one or two paired reed valves, or other type of one-way valve, that is configured so as to be responsive to the angular position of the thrust augmentation duct 136. Of course, many other configurations and design strategies are possible to accomplish the basic functionality of this feature of the invention.

A controller 152, shown schematically in FIG. 3, alternately closes the flight mode intakes 50 when the thrust augmentation ducts 136 are in the downwardly pointing VTOL position, and closes the VTOL mode intakes 48 when the thrust augmentation ducts 136 are in the rearwardly pointing flight position. The controller 152 can be any suitable device or means for managing this alternating relationship between the flight mode intakes 50 and the VTOL mode intakes 48. As a reminder, the flight mode intakes 50 are located along the leading edges 32 of the wings 30. And the VTOL mode intakes 48 are located on the top surface 36 of the wings 30. All air sucked in by the lower impeller 78 is pulled through either the flight mode intakes 50 or the VTOL mode intakes 48. This represents a significant high flow rate and volume of air. By locating the VTOL mode intakes 48 on the top surface 36 of the wings 30 and opening only these VTOL mode intakes 48 during VTOL operation, the intake of air will contribute to the lift of the aircraft 20. By locating the flight mode intakes 50 along the leading edges 32 of the wings 30 and opening only these flight mode intakes 48 during forward flight operation, the intake of air will contribute to the forward propulsion of the aircraft 20.

The foregoing invention has been described in accordance with the relevant legal standards, thus the description is exemplary rather than limiting in nature. Variations and modifications to the disclosed embodiment may become apparent to those skilled in the art and fall within the scope of the invention. Furthermore, particular features of one embodiment can replace corresponding features in another embodiment or can supplement other embodiments unless otherwise indicated by the drawings or this specification.

What is claimed is:

1. A vertical thrust propulsion system for a Vertical Take-Off and Landing (VTOL) fixed wing aircraft, said vertical thrust propulsion system comprising:
    an air flow plenum extending between a plurality of main air intakes and a plurality of main air outlets, said air flow plenum including a compressor housing disposed between said main air intakes and said main air outlets, said compressor housing having upper and lower ends in direct fluid communication with said main air intakes, said compressor housing including a peripheral collector in direct fluid communication with said plurality of main air outlets,
    a centrifugal compressor assembly disposed within said compressor housing, said centrifugal compressor assembly comprising an upper impeller and a lower impeller, said upper and lower impellers disposed for counter-rotation about a generally vertical compressor axis, said upper impeller comprising a plurality of upper vanes contoured to draw air through said upper end of said compressor housing and drive air radially outwardly into said peripheral collector, said lower impeller comprising a plurality of lower vanes contoured to draw air through said lower end of said compressor housing and drive air radially outwardly into said peripheral collector,
    a drive system operatively coupled to said upper and lower impellers for rotating said upper and lower impellers about said compressor axis in opposite directions at substantially the same angular velocity,
    an articulable thrust augmentation duct operatively associated with at least one of said main air outlets, said thrust augmentation duct being supported within an articulation mount enabling said thrust augmentation duct to pivot between a generally downwardly pointing VTOL position and a generally rearwardly pointing flight position,
    said plurality of main air intakes including at least one VTOL mode intake and at least one flight mode intake in communication with said lower end of said compressor housing, said at least one VTOL mode intake being configured for exposure through a top surface of an aircraft wing, said at least one flight mode intake being configured for exposure through a leading edge of an aircraft wing, and a controller for alternately closing said flight mode intake when said thrust augmentation duct is in said downwardly pointing VTOL position and closing said VTOL mode intake when said thrust augmentation duct is in said rearwardly pointing flight position.

2. The vertical thrust propulsion system of claim 1, wherein said plurality of main air intakes includes a central intake configured for exposure through a fuselage portion of the aircraft, said upper end of said compressor housing in direct fluid communication with said central intake.

3. The vertical thrust propulsion system of claim 2, wherein said central intake includes louvers, said louvers being adjustable between at least a forward tilting condition and a rearward tilting condition.

4. The vertical thrust propulsion system of claim 1, wherein said peripheral collector has a quadrilateral shape defined by four discharge corners.

5. The vertical thrust propulsion system of claim 4, wherein said discharge corners are arranged in an isosceles trapezoid pattern with two narrowly-spaced front corners and two widely-spaced rear discharge corners, each of said front and rear discharge corners being in direct fluid communication with said plurality of main air outlets.

6. The vertical thrust propulsion system of claim 1, further including at least one augmentation air intake, said thrust augmentation duct including a central nozzle, a bypass sleeve disposed about said central nozzle, said bypass sleeve configured to naturally aspirate air from said augmentation air intake.

7. The vertical thrust propulsion system of claim 6, wherein said bypass sleeve has a terminal end extending past said central nozzle, said terminal end being scalloped.

8. The vertical thrust propulsion system of claim 1, further including at least one wing-top augmentation intake and at least one leading edge augmentation intake, said thrust augmentation duct including a central nozzle, a bypass sleeve disposed about said central nozzle, said bypass sleeve configured to naturally aspirate air from said wing-top augmentation intake when said thrust augmentation duct is in said downwardly pointing VTOL position, said bypass sleeve being configured to naturally aspirate air from said leading edge augmentation intake when said thrust augmentation duct is in said rearwardly pointing flight position.

9. The vertical thrust propulsion system of claim 8, further including an augmentation valve for selectively closing said leading edge augmentation intake when said thrust augmentation duct is in said downwardly pointing VTOL position and closing said wing-top augmentation intake when said thrust augmentation duct is in said rearwardly pointing flight position.

10. The vertical thrust propulsion system of claim 1, wherein said upper vanes are supported upon an upper shaft section, an upper base plate attached to said upper shaft section and commonly supporting said upper vanes, said lower vanes being supported upon a lower shaft section, a lower base plate attached to said lower shaft section and commonly supporting said lower vanes.

11. The vertical thrust propulsion system of claim 10, wherein said drive system includes a direct-drive electric motor, said direct-drive electric motor including an armature portion and a stator portion, said armature portion operatively attached to one of said upper and lower base plates and said stator portion operatively attached to the other of said upper and lower base plates.

12. The vertical thrust propulsion system of claim 10, wherein each of said upper and lower base plates includes a ring gear, said drive system including a drive shaft disposed between said upper and lower impellers, said drive shaft extending generally perpendicular to said compressor axis, said drive shaft having a pinion gear operatively engaging said respective ring gears of said upper and lower base plates.

13. The vertical thrust propulsion system of claim 10, wherein said drive system includes a combustion turbine disposed within said air flow plenum.

14. The vertical thrust propulsion system of claim 13, wherein each of said upper and lower base plates includes a ring gear, said combustion turbine supported on a shaft having at least one pinion gear, said pinion gear in direct meshing engagement with said ring gears of said upper and lower base plates.

15. A Vertical Take-Off and Landing (VTOL) fixed wing aircraft assembly, said assembly comprising:
an airframe; said airframe comprising a fuselage, at least one wing fixedly attached to said fuselage, said wing having a leading edge and a trailing edge, said wing having a top surface and a bottom surface bounded by said leading and trailing edges,
an air flow plenum contained within said airframe and extending between a plurality of main air intakes and a plurality of main air outlets, said air flow plenum including a compressor housing disposed between said main air intakes and said main air outlets, said compressor housing having upper and lower ends in direct fluid communication with said main air intakes, said compressor housing including a peripheral collector in direct fluid communication with said plurality of main air outlets,
a centrifugal compressor assembly disposed within said compressor housing, said centrifugal compressor assembly comprising an upper impeller and a lower impeller, said upper and lower impellers disposed for counter-rotation about a generally vertical compressor axis, said upper impeller comprising a plurality of upper vanes contoured to draw air through said upper end of said compressor housing and drive air radially outwardly into said peripheral collector, said lower impeller comprising a plurality of lower vanes contoured to draw air through said lower end of said compressor housing and drive air radially outwardly into said peripheral collector,
a drive system operatively coupled to said upper and lower impellers for rotating said upper and lower impellers about said compressor axis in opposite directions at substantially the same angular velocity,
an articulable thrust augmentation duct operatively associated with each of said main air outlets, each said thrust augmentation duct being supported within an articulation mount enabling said thrust augmentation duct to pivot between a generally downwardly pointing VTOL position and a generally rearwardly pointing flight position,
said plurality of main air intakes including at least one VTOL mode intake and at least one flight mode intake in communication with said lower end of said compressor housing, said at least one VTOL mode intake exposed through said top surface of said wing, said at least one flight mode intake exposed through said leading edge of said wing, and a controller for alternately closing said flight mode intake when said thrust augmentation duct is in said downwardly pointing VTOL position and closing said VTOL mode intake when said thrust augmentation duct is in said rearwardly pointing flight position.

16. The vertical thrust propulsion system of claim 15, wherein said plurality of main air intakes includes a central intake exposed through said fuselage, said upper end of said compressor housing in direct fluid communication with said central intake, said central intake includes louvers, said louvers being adjustable between at least a forward tilting condition and a rearward tilting condition.

17. The vertical thrust propulsion system of claim 15, wherein said peripheral collector has a quadrilateral shape defined by four discharge corners, said discharge corners arranged in an isosceles trapezoid pattern with two narrowly-spaced front corners and two widely-spaced rear discharge corners, each of said front and rear discharge corners being in direct fluid communication with said plurality of main air outlets.

18. The vertical thrust propulsion system of claim 15, further including at least one wing-top augmentation intake and at least one leading edge augmentation intake, said thrust augmentation duct including a central nozzle, a bypass sleeve disposed about said central nozzle, said bypass sleeve configured to naturally aspirate air from said wing-top augmentation intake when said thrust augmentation duct is in said downwardly pointing VTOL position, said bypass sleeve being configured to naturally aspirate air from said leading edge augmentation intake when said thrust augmentation duct is in said rearwardly pointing flight position.

19. The vertical thrust propulsion system of claim 18, further including an augmentation valve for selectively closing said leading edge augmentation intake when said thrust augmentation duct is in said downwardly pointing VTOL position and closing said wing-top augmentation intake when said thrust augmentation duct is in said rearwardly pointing flight position.

20. A Vertical Take-Off and Landing (VTOL) fixed wing aircraft assembly, said assembly comprising:
an airframe; said airframe comprising a fuselage, at least one wing attached to said fuselage, said wing having a leading edge and a trailing edge, said wing having a top surface and a bottom surface bounded by said leading and trailing edges,
a forward thrust propulsion system, and
a vertical thrust propulsion system,
said vertical thrust propulsion system including an air flow plenum disposed within said airframe, said plenum extending between a plurality of main air intakes and a plurality of main air outlets, said plurality of main air intakes including a central intake disposed centrally along said fuselage, said central intake including louvers, said louvers being adjustable between at least a forward tilting condition and a rearward tilting condition, said plurality of main air intakes including a plurality of outlier intakes, said plurality of outlier intakes including at least one VTOL mode intake and at least one flight mode intake, said at least one VTOL mode intake being exposed through said top surface of said wing, said at least one flight mode intake being exposed through said leading edge of said wing, a compressor housing disposed between said main air intakes and said main air outlets, said compressor housing having upper and lower ends, said upper end of said compressor housing in direct fluid communication with said central intake, said lower end of said compressor housing in direct fluid communication with said plurality of outlier intakes, said compressor housing including a peripheral collector, said peripheral collector at least partially disposed in said wing, said peripheral collector having a quadrilateral shape defined by four discharge corners, said discharge corners arranged in an isosceles trapezoid pattern with two narrowly-spaced front corners and two widely-spaced rear discharge corners, each of said front and rear discharge corners being in direct fluid communication with plurality of main air outlets,
a centrifugal compressor assembly disposed within said compressor housing of said plenum, said centrifugal compressor assembly including an upper impeller disposed for rotation in one direction about a generally vertical compressor axis, said upper impeller comprising a plurality of upper vanes supported upon an upper shaft section, said upper vanes being contoured to draw air through said central intake and drive air radially outwardly into said peripheral collector, an upper base plate supporting said upper vanes and commonly attached therewith to said upper shaft section, said centrifugal compressor assembly including a lower impeller disposed adjacent said upper impeller for counter-rotation about said compressor axis, said lower impeller comprising a plurality of lower vanes supported upon a lower shaft section, said lower vanes being contoured to draw air through said plurality of outlier intakes and drive air radially outwardly into said peripheral collector, a lower base plate supporting said lower vanes and commonly attached therewith to said lower shaft section, a drive system operatively coupled to said upper and lower impellers for rotating said upper and lower impellers about said compressor axis in opposite directions at substantially the same angular velocity, an articulable thrust augmentation duct operatively associated with each of said main air outlets, each said thrust augmentation duct being supported below said wing within an articulation mount, each said articulation mount enabling the respective said thrust augmentation duct to pivot between a generally downwardly pointing VTOL position and a generally rearwardly pointing flight position, each said thrust augmentation duct including a central nozzle in direct communication with one of said main air outlets of said plenum, each said thrust augmentation duct including a bypass sleeve disposed about said central nozzle, each said bypass sleeve having a terminal end extending past said central nozzle, said terminal end being scalloped, a plurality of augmentation air intakes, said augmentation air intakes including at least one wing-top augmentation intake and at least one leading edge augmentation intake, said bypass sleeve being configured to naturally aspirate air from said wing-top augmentation intake when said thrust augmentation duct is in said downwardly pointing VTOL position, said bypass sleeve being configured to naturally aspirate air from said leading edge augmentation intake when said thrust augmentation duct is in said rearwardly pointing flight position, an augmentation valve for selectively closing said leading edge augmentation intake when said thrust augmentation duct is in said downwardly pointing VTOL position and closing said wing-top augmentation intake when said thrust augmentation duct is in said rearwardly pointing flight position.

* * * * *